US010682892B2

(12) United States Patent
Bracq et al.

(10) Patent No.: US 10,682,892 B2
(45) Date of Patent: Jun. 16, 2020

(54) METHOD FOR MANAGING TYRE IDENTIFIERS

(75) Inventors: Manuel Bracq, Antibes (FR); Philippe Lefaure, Montbrun Lauragais (FR)

(73) Assignee: LDL Technology, Ramonville Saint Agne (FR)

(*) Notice: Subject to any disclaimer, the term of this patent is extended or adjusted under 35 U.S.C. 154(b) by 1128 days.

(21) Appl. No.: 14/409,769

(22) PCT Filed: Jun. 22, 2012

(86) PCT No.: PCT/FR2012/051442
§ 371 (c)(1),
(2), (4) Date: Apr. 20, 2015

(87) PCT Pub. No.: WO2013/190189
PCT Pub. Date: Dec. 27, 2013

(65) Prior Publication Data
US 2015/0239306 A1 Aug. 27, 2015

(51) Int. Cl.
*B60C 23/04* (2006.01)
*B60C 23/00* (2006.01)
(Continued)

(52) U.S. Cl.
CPC ......... *B60C 23/0416* (2013.01); *B60C 19/00* (2013.01); *B60C 23/009* (2013.01);
(Continued)

(58) Field of Classification Search
CPC ............ B60C 23/0408; B60C 23/0493; B60C 23/009; B60C 23/0462; B60C 23/0479;
(Continued)

(56) References Cited

U.S. PATENT DOCUMENTS

2004/0164140 A1* 8/2004 Voeller ............... G07C 5/008
235/375
2004/0172180 A1* 9/2004 Bowman ............ B60C 23/0433
701/31.4
(Continued)

FOREIGN PATENT DOCUMENTS

FR  2 912 235 A1  8/2008

OTHER PUBLICATIONS

International Search Report, dated Jan. 22, 2013, from International Phase of the instant application.

*Primary Examiner* — Yoshihisa Ishizuka
(74) *Attorney, Agent, or Firm* — Paul and Paul

(57) ABSTRACT

The invention relates to a method for managing data relating to an assembly forming a wheel (R) of a vehicle (C), said wheel (R) including a tyre mounted on a rim, said wheel having a measurement module (110), said tyre having an identifier made up of a radio tag (200) such as an RFID marker, said wheel being capable of having different states: mounted in which said tyre is mounted on the rim; and unmounted in which said tyre is not mounted on the rim, in which the measurement module (110) detects a pressure variation inside the tyre, and in which the storage memory of said measurement module (110) is rewritable, characterised in that said method consists of in the event of a pressure variation, replacing the data stored in the measurement module (110) with new data from another tyre. The invention is useful in the management of data relating to tyres and wheels.

13 Claims, 6 Drawing Sheets

(51) Int. Cl.
*G06K 19/00* (2006.01)
*G06K 19/077* (2006.01)
*B60C 19/00* (2006.01)
*G01M 17/02* (2006.01)

(52) U.S. Cl.
CPC ...... *B60C 23/0408* (2013.01); *B60C 23/0447* (2013.01); *B60C 23/0462* (2013.01); *B60C 23/0479* (2013.01); *B60C 23/0483* (2013.01); *B60C 23/0493* (2013.01); *G01M 17/02* (2013.01); *G06K 19/00* (2013.01); *G06K 19/07749* (2013.01); *G06K 19/07764* (2013.01); *B60C 2019/004* (2013.01)

(58) Field of Classification Search
CPC ............ B60C 23/0483; B60C 23/0416; B60C 23/0447; B60C 19/00; B60C 2019/004; G06K 19/00; G06K 19/07764; G06K 19/07749; G01M 17/02
USPC ........................................................ 702/140
See application file for complete search history.

(56) References Cited

U.S. PATENT DOCUMENTS

| | | | |
|---|---|---|---|
| 2006/0012470 A1* | 1/2006 | Chakam | B60C 23/0416 340/445 |
| 2006/0048567 A1* | 3/2006 | Shimura | B60C 23/0408 73/146.5 |
| 2007/0139171 A1* | 6/2007 | Fischer | G07C 9/00309 340/426.2 |
| 2007/0279203 A1* | 12/2007 | Thomas | B60C 23/068 340/447 |
| 2008/0133081 A1* | 6/2008 | Colarelli | B60C 23/0408 701/29.2 |
| 2008/0252435 A1* | 10/2008 | Chien | B60C 23/009 340/438 |
| 2009/0027183 A1* | 1/2009 | Kvisteroy | B60C 23/0416 340/447 |
| 2010/0090819 A1* | 4/2010 | Benedict | B60C 23/0408 340/447 |
| 2010/0156641 A1* | 6/2010 | Lionetti | B60C 23/0408 340/572.1 |
| 2010/0171604 A1* | 7/2010 | Heller | B60C 23/0416 340/438 |

* cited by examiner

METHOD FOR MANAGING TYRE IDENTIFIERS

FIELD OF APPLICATION OF THE INVENTION

The present invention relates to the field of the management of data associated with vehicle wheels and in particular to adaptations for communicating information related to the tire on the wheel as well as possible.

DESCRIPTION OF THE PRIOR ART

Tires are conventionally associated with an identifier. This identifier may for example take the form of a code inscribed on the tire.

The advantage in particular for the manufacturer, the supplier, and the user is to be able to precisely trace the life of a tire, to identify any retreading thereof, to know the dates at which maintenance was carried out, etc. Such traceability also makes it possible to envisage monitoring any occasion when counterfeit tires are brought into service.

One of the technical problems related to the implementation of such traceability lies in the monitoring and location of tires, which may be moved from one rim to another during a maintenance operation, but also in the location of the wheel equipped on the motorized vehicle. This is because wear on tires is not always similar and may vary according to the position allocated to the tire, in particular on a truck of the heavy goods vehicle type.

In order to optimize the function of the identifier, integrating, in the rubber of the tire, radio-frequency tags containing a chip, an antenna, and a unique memory capable of being read by equipment are at present known. These radio-frequency tags, known as an RFID (standing for radio-frequency identification) tag or marker are capable of storing data but also retrieving them when they are interrogated.

In order to implement dialogue with these radio-frequency tags, systems exist proposing wound antennas (using low-frequency technology around 125 kHz) fixed to the chassis of the vehicle close to the wheel arches. These antennas are connected to onboard electronics capable of controlling them. These antennas interrogate the radio-frequency tag integrated in the tire, which responds by transmitting the data relating to the tire in question. The tire is then identified and located in this example.

Use of such technology requires the presence on board of an expensive electronic system that is difficult to install on the vehicle, with antennas that are particularly exposed in the wheel arches.

Furthermore, this technology, relying on the use of a radio-frequency tag of the so-called passive RFID marker (not supplied with energy), requires the use of a suitable antenna in order in particular to cover the 360 degrees of angle and thus always to remain accessible to communication with the antennas fixed to the chassis of the vehicle.

One solution comprises an antenna running round the tire. The problem with such a solution lies in the cost thereof, which requires one antenna per wheel and an onboard computer dedicated to this application, but also in its complexity, and in the fragility of the parts embedded at the antennas.

Another solution comprises using another data management system related to the wheels and capable of equipping the vehicle. Thus, for example, there exist in the prior art systems for monitoring the pressure of the tires (referred to as TPMS, standing for tire pressure monitoring system) which associate with each wheel measuring modules fixed to each wheel. These measuring modules are each equipped with an antenna which, for each wheel and by means of a radio-frequency network, communicates with antennas of reception units associated with the chassis, information related to parameters measured in the tire.

If communication between the radio-frequency tags and the antennas of the tire monitoring system does not appear to be envisageable, the prior art discloses a system where the radio-frequency tag communicates with the measuring module fixed to the wheel, a module then including in the information that it transmits the information related to the tire itself.

Although capable of affording a solution to the necessary proximity between the radio-frequency tag and the technical means for activating same, the latter solution also involves each module of each wheel being equipped not only to store and transmit the new information but also to activate, interrogate and read said radio-frequency tags, which constitutes an additional cost.

In addition, the positioning on the wheel of the measuring module and that of the radio-frequency tag requires particular attention in that the distance between the antenna of the measuring module and the radio-frequency tag must be as short as possible whereas conventionally the angular arrangement of the tire on the rim is of little importance.

DESCRIPTION OF THE INVENTION

Starting from this state of affairs, the applicant carried out research aimed at solving the drawbacks of the prior art related to the exploitation of a communication network existing between the wheels and the chassis for purposes of traceability of tires.

This research results in not only in a method for optimizing the management of the tire identification data but also avoiding the drawbacks related to the use of radio-frequency tags associated with each tire.

The method of the invention assumes the management of data relating to an assembly forming a vehicle wheel, said wheel comprising a tire mounted on a rim, said wheel carrying a measuring module, said tire carrying an identifier comprising a radio-frequency tag of the RFID marker type,
said wheel being able to have various states:
- mounted, where said tire is mounted on the rim;
- demounted, where said tire is not mounted on the rim;
- where the measuring module detects the variation in pressure in the tire, and
- where the storage memory of said measuring module is rewritable. This method is remarkable in that it comprises, when there is a variation in pressure, replacing the data stored in the measuring module with new data issuing from another tire.

Thus, when the tire undergoes a variation in pressure determining the need for maintenance, the necessary new tire will serve as a source for new data, in particular the identification data replacing and therefore deleting the old identification data stored in the memory of the measuring module. This feature, exploiting one of the functionalities of the measuring modules, ensures flexibility of the system and takes account of the fact that any changes or maintenance operations related to the tire will result in a variation in pressure.

The applicant has selected several possibilities for taking into account the event triggering replacement.

According to another particularly advantageous feature of the invention, the method comprises defining a low pressure threshold, the passing of which, detected by the measuring module, triggers the deletion by replacement of the content of the memory of the measuring module containing the data associated with the identifier. It is then a pressure drop that triggers the replacement.

According to another particularly advantageous feature of the invention, the method comprises defining a high pressure threshold, the passing of which, detected by the measuring module after passing of the low threshold, and therefore when the pressure rises again, triggers the replacement and therefore the deletion of the content of the memory of the measuring module containing the data associated with the identifier.

According to this feature, it is therefore once the pressure returns in the tire that the deletion and replacement are performed, that is to say when a new tire with a new identifier is installed.

Communication between the wheel module and the RFID radio-frequency tag has been studied by the applicant.

According to a particularly advantageous feature, the method is remarkable in that the data associated with the identifier are transmitted to the measuring module by means of an intermediate unit separate from the assembly and the vehicle, comprising data transmission means.

This feature is particularly advantageous in that it makes it possible to implement real-time traceability of the tires without a supplementary transmission system by using the already existing communication network used for purposes of tire monitoring. This method thus means that, in addition to the data conventionally transmitted by this type of equipment, the various messages sent by the measuring module then comprise the data related to the tires themselves as described above. These data can be recovered by the same communication network as the one transmitting the wheel monitoring data.

In concrete terms, the intermediate unit comprises a means of entering the identifier or reading the latter in order then to transmit it to said module. One technical effect issuing from the matching between the identifier of the tire and that of the pressure measuring module lies in the fact that a single interrogation makes it possible to have available two items of information without requiring pressing several buttons on said trigger.

Thus these data associated with the identifier and/or the identifier itself are, according to a particularly advantageous feature, transmitted to the measuring module, which stores them in order for them to be present in the communications made by said module in its own network. This is because, according to another feature of the invention, where the measuring module communicates with a reception unit integrated in the chassis of the vehicle, the method comprises integrating, in the frame by which said module communicates with the reception unit, all or some of the data issuing from the reading of the identifier and stored in the memory of said module. The method of the invention makes it possible to check in real time parameters related to the tires of the vehicle or of a fleet of vehicles by matching with a communication network and/or the geolocation system able to equip the vehicle or fleet of vehicles.

According to another particularly advantageous feature, said intermediate unit communicates with said radio-frequency tag and said measuring module so as to match the identification data of the tire with those of the measuring module and sends said matching to the reception unit associated with the chassis. This matching and sending performed just once make it possible to create a matching table at the management system receiving all the data, a matching table that prevents the identifier of the measuring module and/or that of the radio-frequency tag being routinely present associated in the frame, thus reducing the transmission time as well as the consumption of the batteries associated with the various transmission means (that of the measuring module but also that of the reception unit, etc.).

Said identifier comprising the radio-frequency tag of the RFID marker type, the method of the invention comprises reading said radio-frequency tag by means of the intermediate unit and transmitting the data read to said measuring module. This feature avoids the drawbacks of the prior art relating to the management of said radio-frequency tags by cleverly using the tire monitoring network without having to equip each measuring module with a reading means compatible with RFID technology. Thus, in order to implement the method, only the intermediate unit is equipped with said reading means compatible with RFID technology. According to a particularly advantageous feature, the intermediate unit reads and writes in the radio-frequency tag of the RFID marker type. This feature makes it possible for example to write in said marker the actual maintenance information operated on the tire and therefore to complete the history of said tire.

According to another feature related to a configuration of twin wheels each equipped with a measuring module and a radio-frequency tag, the method is remarkable in that said trigger is designed in order to seek, once positioned in front of the twin axle, two different radio-frequency tags until they are found by eliminating the first signal received in order better to concentrate on the reception from the second.

The applicant has also imagined an alternative communication solution of the method of the invention which, according to this alternative, is remarkable in that the measuring module activates and/or communicates with the radio-frequency label by means of a transmission of waves beyond 100 MHz, reflected on the metal structure of the tire.

According to a preferred embodiment, the measuring module transmits these waves which, reflected on the metal structure of the tire, will activate the radio-frequency tag, which for its part is not supplied autonomously.

This feature initiates a direct dialogue between the measuring module and the radio-frequency tag and makes it possible in real time and in movement, without external action and therefore without passing through the trigger, using a frequency range reflected in the space of the tire and thus allowing dialogue whatever the position and distance between the radio-frequency tag and the measuring module.

In order to implement such communication, the measuring module equipping the wheel is equipped with an isotropic antenna guaranteeing multidirectional transmission and reception in the tire.

Said dialogue may also be effected between the radio-frequency tag and the reception unit associated with the vehicle chassis, the measuring module then merely activating the radio-frequency tag and dialoguing with said reception unit. Said radio-frequency tag then transmits the data that it contains, to the reception unit rather than to the measuring module.

So that the deletion proposed by the main feature is not caused accidentally, the method is remarkable in that, according to another particular advantageous feature, the pressure variation is measured over a given period before replacing the identifier associated with the radio-frequency tag in the electronic module. For example, the pressure drop must be able to have been triggered several times over a relatively long period before triggering said replacement.

According to another feature, the method comprises, in the memory of the measuring module, associating information related to the measured pressure drop with the data issuing from the RFID marker stored in the memory. In such an embodiment, the measuring module stores a pressure below a low pressure threshold, a threshold passed over a certain length of time. Thus, when the measuring module is interrogated by the intermediate or trigger unit, it transfers this damage to said unit in the form of a potential maintenance. This potential maintenance information is transmitted to and written in the RFID marker of the tire in a way that is concealed from the operator, the operator that for his part should notify to said marker the actual maintenance operation of this tire via the intermediate unit during the service on the tire. If the rim of the tire is changed during this maintenance operation without the measuring module having been notified by the operator, said module will already have informed the reception unit and therefore the communication network managing the fleet.

In addition, before reintegrating a tire identifier in the memory of the measuring module, this information can be notified to the intermediate unit as an alert before admission of a new RFID code of the new tire.

According to another feature, the data from the radio-frequency tag are transmitted to said measuring module when the wheel is being mounted, that is to say when the wheel assembly is in a state where the tire is not yet fixed to the rim.

The various possibilities of working method features are numerous, for example:
- the data are transmitted to said measuring module when there are no data relating to the tire entered in the memory of said module;
- the data issuing from the tire are transmitted to said module with supplementary data such as for example data relating to a maintenance operation.

The invention also concerns the device forming an intermediate unit for transmitting data in accordance with all or some of the features of the method described above.

According to one feature, this device is portable and is in the form of a trigger containing the functionalities for entering or reading the identifier carried by the tire and transmitting it to said measuring module. The portability of said device ensures the correct distance between the latter and the radio-frequency tag for activation and reading thereof.

According to another feature, said unit is integrated in a device for mounting and removing the tire.

The fundamental concepts of the invention having just been disclosed above in their most elementary form, other details and features will emerge more clearly from a reading of the following description with regard to the accompanying drawings, giving, by way of non-limitative example, an embodiment of a method and devices in accordance with the invention.

DESCRIPTION OF PREFERRED EMBODIMENTS

Figure 1:
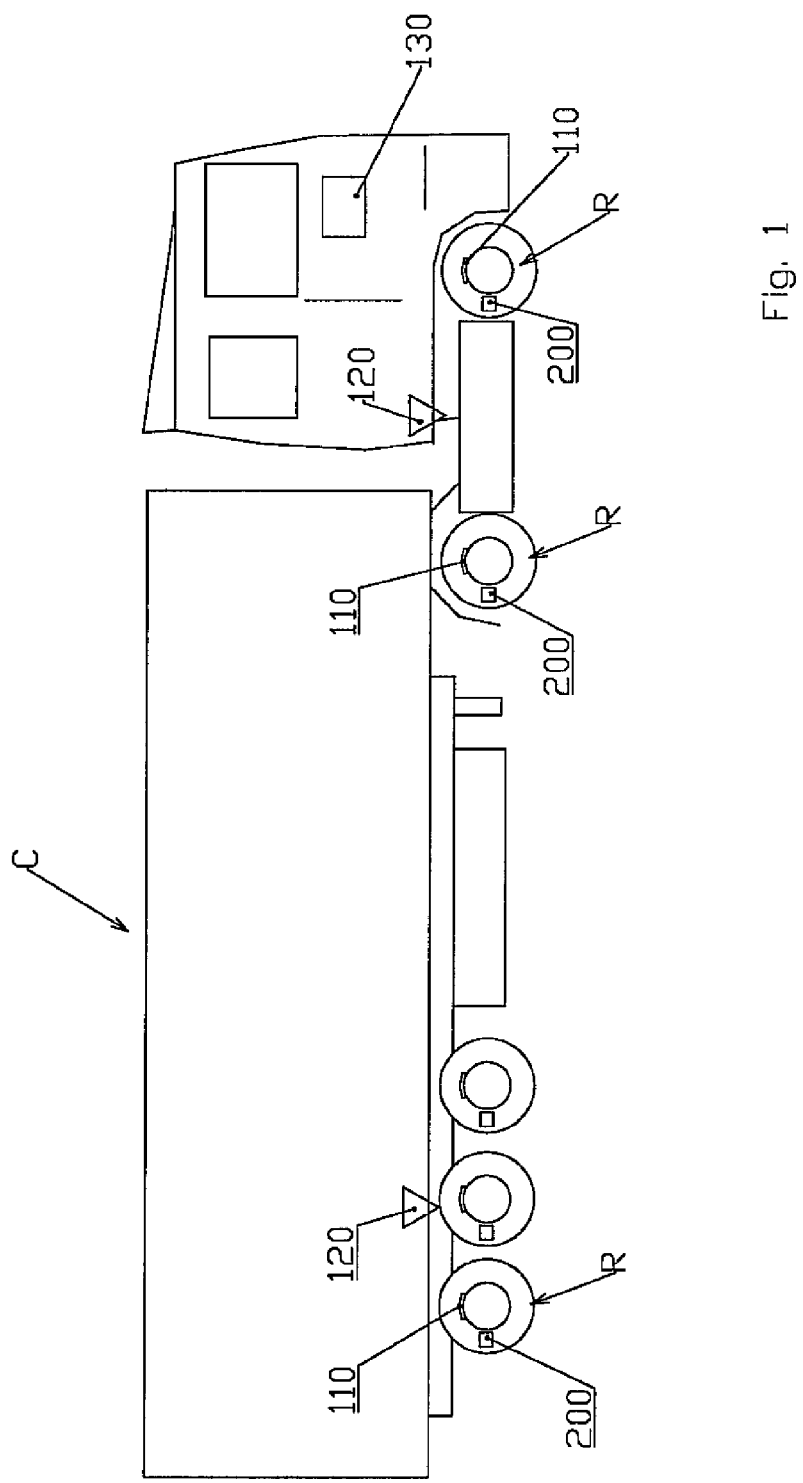
FIG. 1 is a schematic drawing of a truck equipped with a device for monitoring the tire pressure and tires equipped with an RFID marker.
Figure 1A:
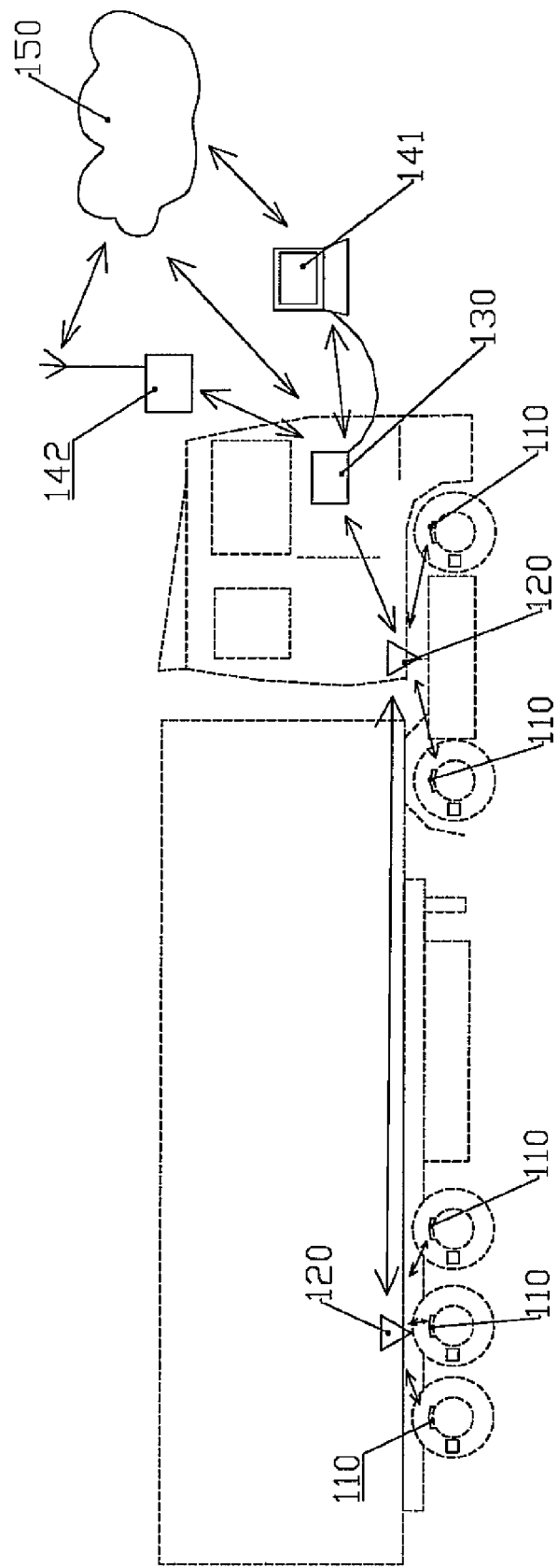
FIG. 1*a* illustrates the possible communications between the different emission and reception subassemblies of the vehicle of FIG. 1.

As illustrated on the drawings of FIGS. 1 and 1*a*, the vehicle C is equipped with a device for monitoring the pressure of the tires comprising measuring modules 110 fixed to each wheel R and communicating with reception units 120 fixed to the chassis of the vehicle C, which communicate with a central reception unit 130. This central reception unit 130 is capable of communicating with or without wire with a computer 141, a relay antenna 142, or with any means of connection to a network 150 of the GSM, GPS, etc. type. As illustrated, there is no communication between the measuring module 110 and the radio-frequency tag 200 associated with each wheel or between the radio-frequency tag 200 and the reception unit 120.

Figure 3:
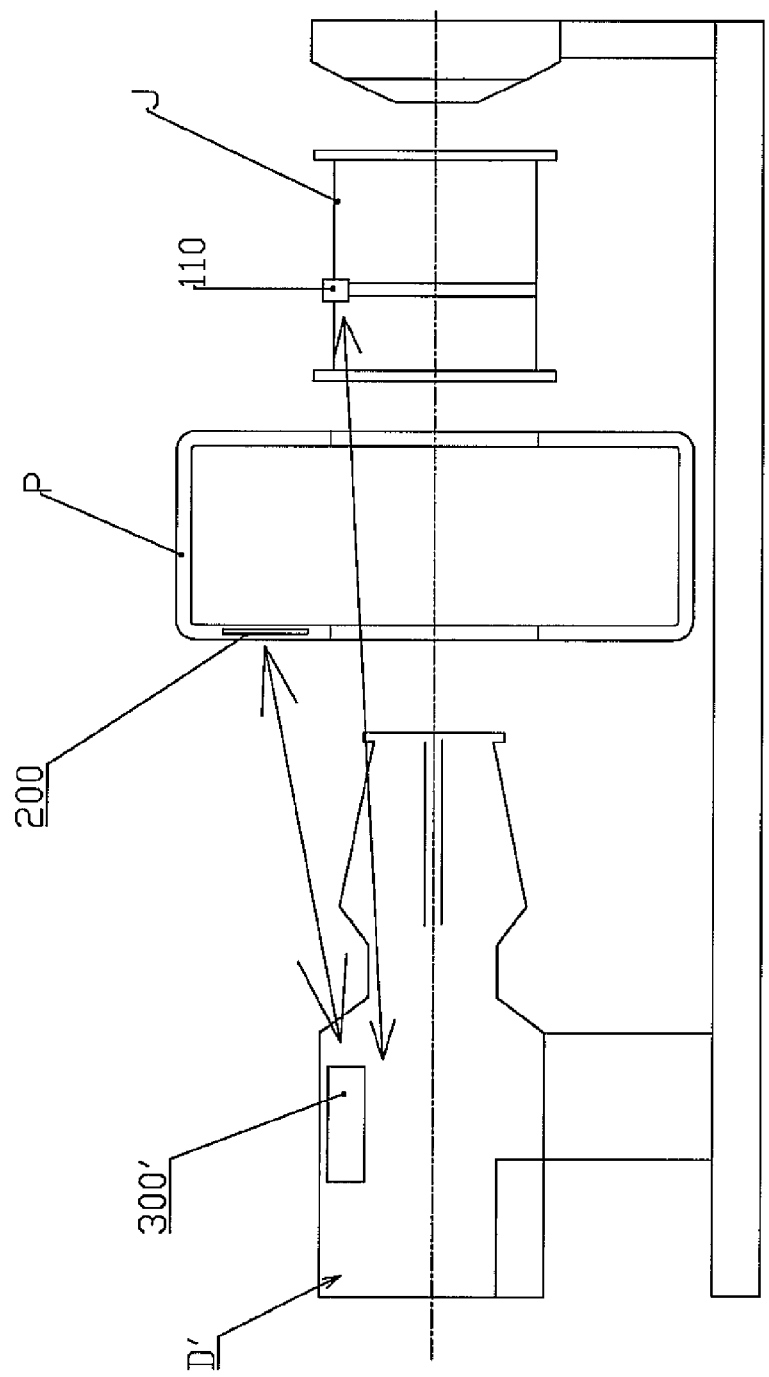
FIG. 3 is a schematic drawing of a tire mounting device integrating an embodiment of a transmission device of the invention.
Figure 4:
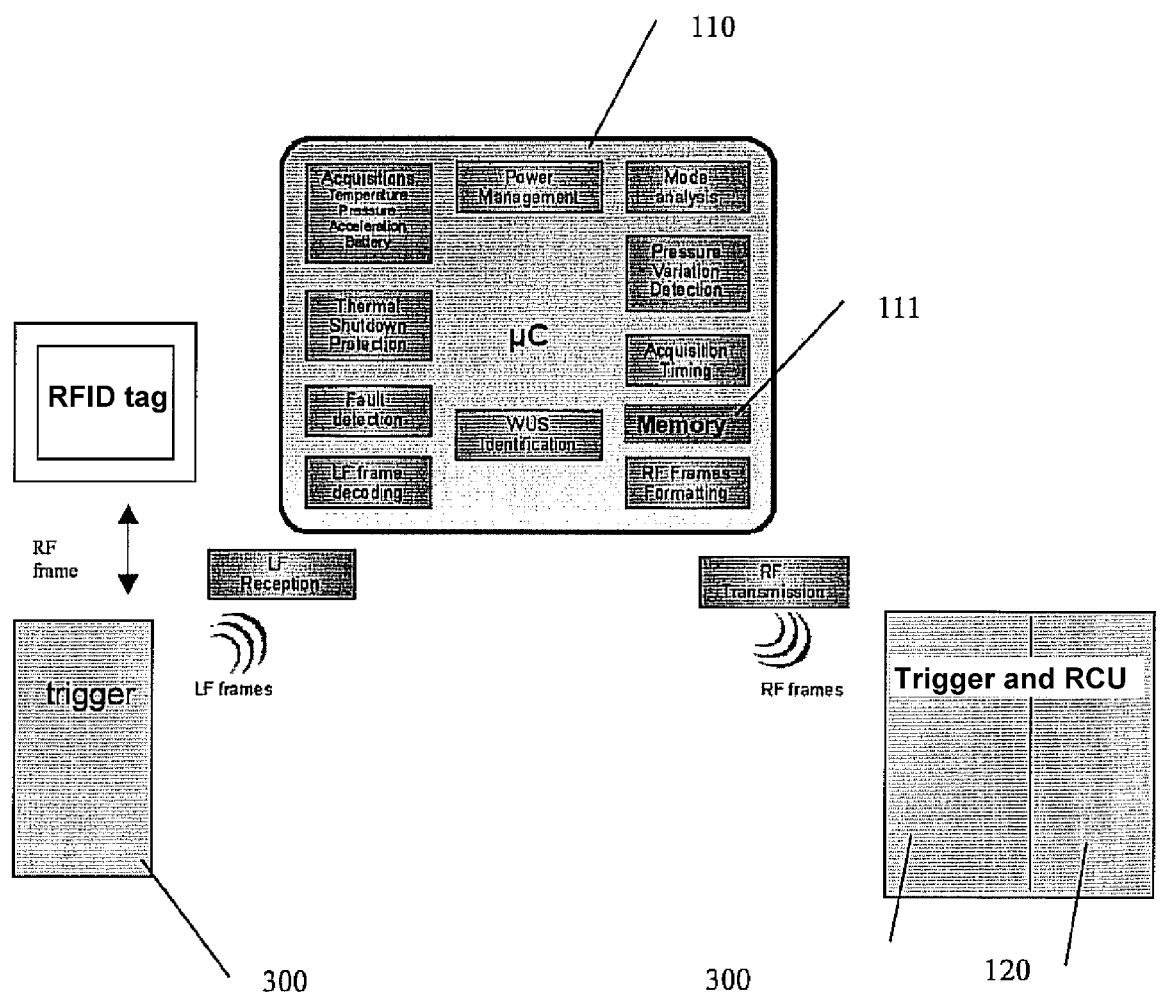
FIG. 4 is a block diagram of a measuring module.

Like the one illustrated on the drawing of FIG. 3, the wheels R receive tires carrying identifiers of the RFID marker type 200. According to a preferred but non-limitative embodiment, the measuring modules are fixed to the rim and the RFID markers are embedded in the thickness of rubber constituting the sidewall of the tire. The position of the marker 200 with respect to the measuring module is of little importance because of the method of the invention.

This is because, so that the identifiers and/or the data associated with the identifiers are transmitted in the communication frame of the measuring modules 110, the method of the invention proposes that the data associated with the identifier are transmitted to the measuring module for storage purposes, by means of an intermediate unit separate from and independent of the wheel R and vehicle C, comprising the data transmission means.

Figure 2:
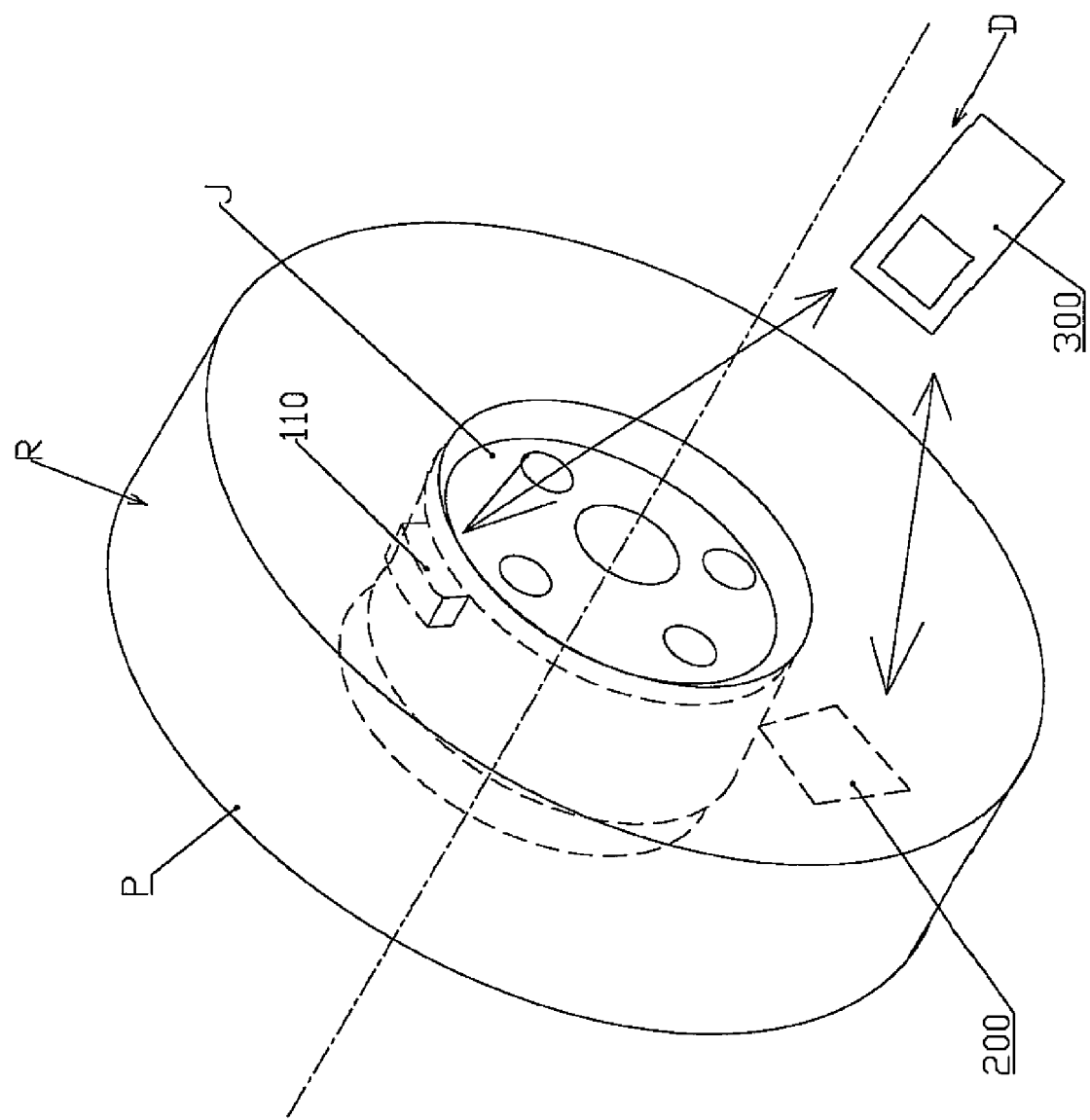
FIG. 2 is a schematic drawing of a portable transmission device and a wheel.

To do this, according to a first implementation solution illustrated by the drawing in FIG. 2, a portable device D of the electronic communication box type 300, referred to as a "trigger", equipped with means of communication with the RFID markers 200 and means of communicating with the measuring modules 110, transmits the identifier and/or data associated with the identifier so that said measuring module 110 provides the storage and transmission thereof in its network communicating with the reception units 120 carried by the vehicle or in any dialogue with a suitable interrogation means. This intermediate unit will also make it possible to enter data in said markers.

The portability of the device enables its user to approach as close as possible to the subassemblies with which it must communicate and to effect for example the required transmission when the wheels are already mounted on the vehicle.

Naturally the identifier or the data stored in the marker may be associated with other data available in independent databases.

This portable device D can in particular effect the transmission, or interrogate said measuring modules when the tires are already mounted.

The applicant has nevertheless provided another transmission solution appropriate to the operations related to the installation of the tire itself. Thus, as illustrated in the drawing of FIG. 3, the device 300' for transmitting the data read on the RFID marker 200 of the tire P to be mounted in the memory of the measuring module mounted or to be mounted on the rim J is integrated in a device D' for mounting and removing the tire.

As illustrated on the block diagram of the measuring module 110, the latter keeps its constituent elements participating in its function of measuring and communicating with a network by radio frequency. In accordance with the advantages of the method of the invention, it is not modified for purposes of communication with an RFID marker since it is an intermediate unit independent of the wheel or vehicle which, equipped with suitable communication means, communicates with the RFID marker and transmits the data read to said measuring module and vice versa. To integrate these new data, the capacity of the memory 111 may nevertheless be increased.

Figure 5:
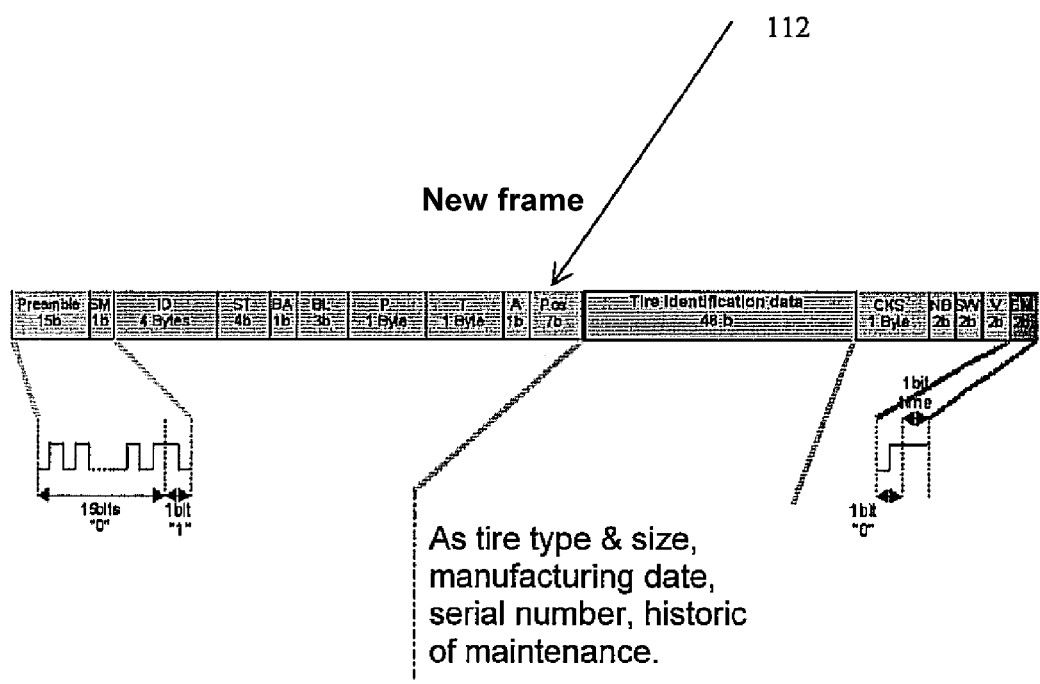
FIG. 5 is a schematic drawing of a communication frame.

In addition, in accordance with the drawing in FIG. 5, the frame 112 is extended by 48 additional bits in order to integrate the parameters of the tire.

According to an embodiment that is not illustrated, said electronic measuring module 110 sends waves with a frequency going beyond 100 MHz to enable them to be reflected by the metal reinforcement of the tire in order to activate the radio-frequency tag and/or communicate with the latter.

It will be understood that the method and devices that have just been described and depicted above were described and depicted with a view to disclosure rather than a limitation. Naturally various arrangements, modifications and improvements can be made to the above example without departing from the scope of the invention.

KEY TO THE FIGURES

FIG. 4

| Tag RFID | RFID tag |
| Trigger et RCU | Trigger and RCU |

FIG. 5

| Nouvelle trame | New frame |

The invention claimed is:

1. A method for managing data relating to an assembly forming a wheel of a vehicle having a chassis, said wheel including a tire having an identifier;
said wheel comprising a first tire mountable on a rim, said wheel carrying a measuring module having a rewriteable storage memory having a content, said first tire carrying an identifier comprising a first radio-frequency tag having data associated with the identifier of the first tire, said wheel being either:
mounted, where said first tire is mounted on the rim; or
demounted, where said first tire is not mounted on the rim;
where the measuring module detects can detect a variation in pressure in the first tire, characterized in that the method comprises,
detecting a variation in pressure in the first tire, and
replacing the data stored in the measuring module and associated with the identifier of the first tire with data issuing from a second tire having a second radio-frequency tag and associated with the identifier of the second tire, responsive to the detected variation in pressure.

2. The method according to claim 1, characterized in that the method further comprises defining a low pressure threshold, detecting the pressure passing below said low pressure threshold by the measuring module and triggering deletion by replacement of the content of the memory of the measuring module containing the data associated with the identifier of the second tire.

3. The method according to claim 1, characterized in that the method further comprises defining a high pressure threshold, detecting the pressure passing above said high pressure threshold by the measuring module after passing below of the low threshold, and therefore when the pressure rises again, and triggering a replacement and therefore the deletion of the content of the memory of the measuring module containing the data associated with the identifier of the second tire.

4. The method according to claim 1, further comprising the measuring module activating and/or communicating with the radio-frequency tag by means of a transmission of waves beyond 100 MHz reflected on a metal structure of the first or second tire.

5. The method according to claim 4, wherein the measuring module communicating with a reception unit integrated in the Chassis of the vehicle, characterized in that said radio-frequency tag transmits the associated data that the radio-frequency tag contains to the reception unit.

6. The method according to claim 4, characterized in that the method further comprises equipping the measuring module with an isotropic antenna.

7. The method according to claim 1, further comprising the measuring module communicating with a reception unit integrated in the Chassis of the vehicle, characterized in that the method further comprises integrating, in a communication frame of said measuring module, all or some of the associated data from the reading of the identifier of the second tire and stored in the memory.

8. The method according to claim 1, characterized in that the method further comprises measuring the variation in pressure over a given period before effecting the replacement of the identifier associated with the radio-frequency tag of the second fire in the measuring module.

9. The method according to claim 1, further comprising transmitting the associated data of the second tire from the radio-frequency tag to said measuring module when the wheel is being mounted.

10. The method according to claim 1, further comprising transmitting the associated data to said measuring module when there are no data relating to the first or second tire entered in the memory of said module.

11. The method according to claim 1, further comprising transmitting associated data from the first or second tire to said module with supplementary data.

12. The method according to claim 1, characterized in that the method further comprises, in the memory of the measuring module, associating, with the associated data from the first radio-frequency tag stored in the memory, information relating to a measured pressure drop.

13. The method according to claim 1, further comprising an intermediate unit communicating with said radio-frequency tag and said measuring module so as to match the Identification data of the first or second tire with those of the measuring module and sending said match to the reception unit associated with the Chassis.

* * * * *